United States Patent
Lee

(10) Patent No.: US 6,194,848 B1
(45) Date of Patent: Feb. 27, 2001

(54) AUTOMATIC MAGNETIC FIELD COMPENSATOR FOR A CRT

(75) Inventor: Sang-Hae Lee, Suwon (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/186,365

(22) Filed: Nov. 5, 1998

(30) Foreign Application Priority Data

Nov. 5, 1997 (KR) .................................... 97-58213
Dec. 29, 1997 (KR) .................................... 97-77359

(51) Int. Cl.$^7$ .................................................. G09G 1/04
(52) U.S. Cl. ................................................ 315/370; 315/8
(58) Field of Search .................... 315/370, 8, 368.11, 315/368.12, 367, 85; 340/870.21; 341/110, 126, 137, 155, 156, 157, 171

(56) References Cited

U.S. PATENT DOCUMENTS

| | | | |
|---|---|---|---|
| 3,836,262 | * | 9/1974 | Yata et al. ............................ 356/226 |
| 4,169,287 | * | 9/1979 | Middendorf et al. ................ 364/835 |
| 4,300,390 | * | 11/1981 | Shimizu ............................... 73/178 R |
| 4,445,279 | * | 5/1984 | Tsushima et al. ..................... 33/356 |
| 4,598,270 | * | 7/1986 | Shutt et al. ..................... 340/347 NT |
| 4,622,754 | * | 11/1986 | Chujo et al. ........................... 33/356 |
| 4,768,019 | * | 8/1988 | Linder .......................... 340/347 NT |
| 4,870,329 | * | 9/1989 | Ara ........................................ 315/367 |
| 4,897,658 | * | 1/1990 | Fujii et al. ............................. 341/161 |
| 5,298,902 | * | 3/1994 | Kogan ................................... 341/157 |
| 5,319,370 | * | 6/1994 | Signore et al. ....................... 341/120 |
| 5,497,155 | * | 3/1996 | Izuhara ................................. 341/156 |
| 5,510,677 | * | 4/1996 | Nagashima .............................. 315/8 |
| 5,614,791 | * | 3/1997 | Kume et al. .......................... 315/370 |
| 5,751,112 | * | 5/1998 | Monma et al. .......................... 315/8 |
| 5,847,511 | * | 12/1998 | Lee .......................................... 315/8 |
| 5,982,178 | * | 11/1999 | Kawamura et al. ................. 324/252 |

* cited by examiner

*Primary Examiner*—Seungsook Ham
*Assistant Examiner*—Zakia N. Gregory
(74) *Attorney, Agent, or Firm*—Robert E. Bushnell, Esq.

(57) ABSTRACT

An apparatus for automatically compensating for the deflection of electron beam in a cathode ray tube display by the earth's magnetic field (EMF) detects the EMF at the installation site of the cathode ray tube display by the EMF detector comprising a plurality of magnetic sensors for sensing the x, y, z component of magnetic field. A pulse generator and a counter transform each detected component of the EMF into a predetermined gate signal and then output the gate signal to the microcomputer. The microcomputer compares the gate signal indicative of the detected EMF with a reference signal stored in the internal memory to obtain a compensation value. The microcomputer further outputs the compensation value to a processor, which automatically compensates for the deflection of electron beam in a cathode ray tube.

6 Claims, 3 Drawing Sheets

AUTOMATIC MAGNETIC FIELD COMPENSATOR FOR A CRT

CLAIM OF PRIORITY

This application makes reference to, incorporates the same herein, and claims all benefits accruing under 35 U.S.C § 119 from an application entitled *Automatic Magnetic Field Compensator For A CRT* earlier filed in the Korean Industrial Property Office on Nov. 5, 1997, and there duly assigned Ser. No. 97-58213 by that Office.

BACKGROUND OF THE INVENTION

1. Field of the Invention

The present invention relates to an automatic magnetic field compensator for a cathode ray tube, and more particularly to an apparatus for automatically compensating for the changes generated in a display with a cathode ray tube in effect of the earth's magnetic field by using magnetic sensors detecting the earth's magnetic field.

2. Description of Background Art

Usually, a display with a cathode ray tube (CRT) has a problem that both sides of a screen tilt upward or downward in response to the effect of the earth's magnetic field (hereinafter: 'earth's magnetic field' is abbreviated as 'EMF'.) according to the installation direction, i.e. north, south, east or west. Accordingly, the effects of the EMF must be eliminated to realize a stabilized picture on a screen. More particularly, a tilt of screen is compensated for by flowing direct current (DC) with variable flowing direction and variable current intensity through a compensation coil for EMF wound around the neck of a CRT, around which a deflection yoke is also wound.

An apparatus for compensating for the deflection of electron beam in a CRT display is described in the Korean patent application No. 94-1310 (its Korean examined publication No. 96-13551).

The above-mentioned automatic magnetic field compensator, which is set forth in FIG. 1, comprises a compensation value determining unit 10 for generating compensation values respectively corresponding to each directional magnetic field, and a direction detect and select unit 20 for receiving the compensation values from the compensation value determining unit 10 and sensing the direction of a CRT to selectively output one of the received compensation values. This automatic magnetic field compensator further comprises a deflection compensating unit 30, coupled to the direction detect and select unit 20, for receiving the selected compensation values from the direction detect and select unit 20 and compensating for deflection of electron beam emanating from an electron gun in a CRT.

In FIG. 1, the direction detect and select unit 20 comprises a directional sensor (not shown) and an output select switch (not shown), thereby detecting the direction of a CRT to control the output of output select switch in response to the detection result. A compensation value of the east is set to be a reference voltage and VA indicates a compensation value of the west. VB indicates a compensation value of the south and VC indicates a compensation value of the north.

To explain the automatic magnetic field compensator referring to FIG. 1, the directional sensor in the direction detect and select unit 20 detects the present direction of a CRT. The direction detect and select unit 20 controls the output select switch to input the compensation values from the compensation value determining unit 10, which corresponds to the direction of a CRT, to the deflection compensate unit 30. The deflection compensate unit 30 compensates for the deflection of electron beam in a CRT in response to the input compensation values, thereby compensating for picture distortion, screen tilt, and color convergence to display a normal picture on a CRT screen.

The conventional automatic magnetic field apparatus described above, however, has a disadvantage that a display with a cathode ray tube must apply a predetermined voltage to the magnetic field compensator continuously in order to compensate for picture distortion and color convergence and therefore the display consumes power excessively.

SUMMARY OF THE INVENTION

It is an object of the present invention to provide an apparatus for automatically compensating for the deflection of electron beam in a CRT display by the EMF using magnetic sensors automatically detecting EMF.

To achieve the above-mentioned objects, an apparatus for automatically compensating for the deflection of electron beam in a CRT display by the EMF comprises detection means for detecting the EMF in response to the EMF output control signals, a pulse generator for generating pulse signals with a predetermined frequency corresponding to the EMF detected by the detection means, a counter for counting the pulse signals from the pulse generator at predetermined times to generate a gate signal, control means for receiving the gate signal generated by the counter and comparing the gate signal with a reference signal to generate a compensation value for the EMF, the control means further generating output state control signals for controlling the output state of the detection means, and process means for compensating for the deflection of electron beam emanating from an electron gun in a cathode ray tube in response to the compensation value generated by the control means.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

The present invention will now be described in detail referring to the accompanying drawings.

Figure 1:
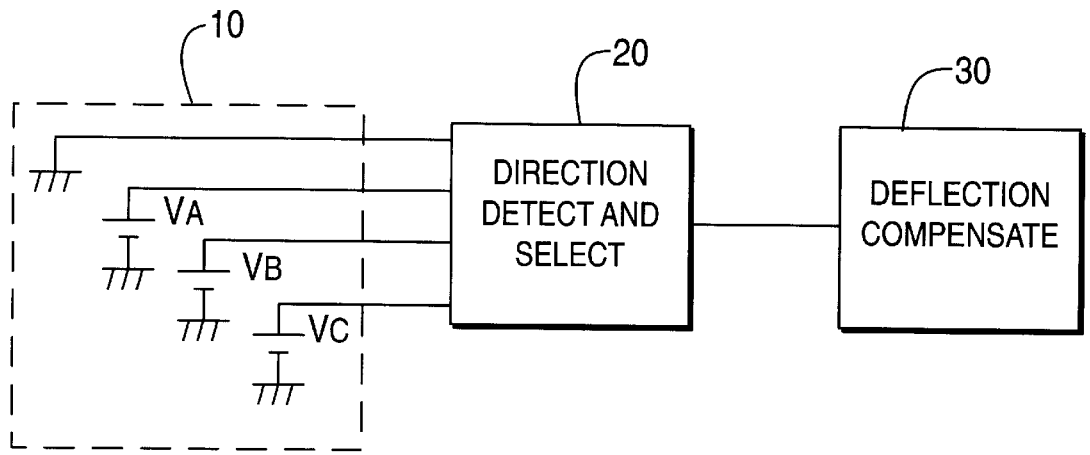
FIG. 1 is a schematic block diagram of a known automatic magnetic field compensator for a CRT display.
Figure 2:
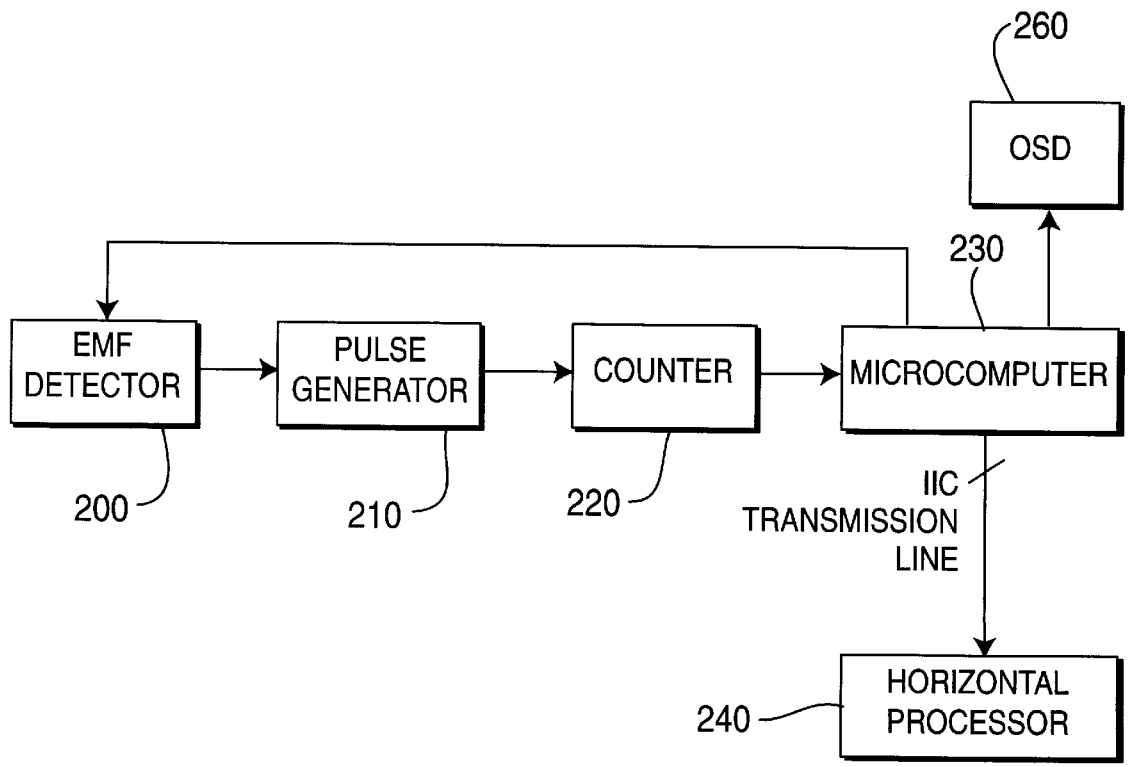
FIG. 2 is a schematic block diagram of an automatic magnetic field compensator for a CRT display constructed in accordance with the principles of the present invention.

As illustrated in FIG. 2, the earth's magnetic field (EMF) detector 200 comprises a plurality of magnetic sensors (not shown) to detect the EMF in response to the earth's magnetic field (EMF) output control signals. The magnetic sensors detect x, y, z components of EMF and output each forward and/or reverse x, y, z component of EMF, respectively. A pulse generator 210 generates and outputs pulse signals having a predetermined frequency corresponding to the EMF, which field is input from the EMF detector 200. A counter 220 counts the pulse signals from the pulse generator 210 to generate a gate signal in response to the count value of the pulse signals. Preferably, the gate signal corresponds to a predetermined number of the pulse signals. A microcomputer 230 receives the gate signal generated by the counter 220 and compares the gate signal with a reference signal to generate a compensation value for the EMF. The microcomputer 230 further generates the output state control signals to control the output state of the EMF detector 200. The output state control signals generated by the microcomputer 230 make each directional component of EMF, including each forward and reverse directional component, be sequentially input to the pulse generator 210. A horizontal processor 240 compensates for the deflection of electron beam emanating from an electron gun in a cathode ray tube in response to the compensation value generated by the microcomputer 230 and thereby stabilized pictures are displayed on a screen of a CRT. Preferably, an automatic magnetic field compensator according to the present invention comprises an on-screen display unit 260. The on-screen display unit 260 serves to display various associated information received from the control means on a screen in order for a user to monitor the present state of operation or select an operation mode he wants.

Functions and operations of the automatic magnetic field compensator in accordance with the present invention will now be illustrated in detail referring to the accompanying drawings.

If a user installs a display with a CRT, made in the northern hemisphere, at a site of the southern hemisphere, the EMF detector 200 detects the EMF at the installation site of the CRT display and outputs the detected magnetic field to the pulse generator 210. Then the pulse generator 210 generates the pulse signals corresponding to the input EMF and outputs the pulse signals to the counter 220. The counter 220 counts the pulse signals from the pulse generator 210 to generate a gate signal in response to the count value of the pulse signals. The counter 220 serves to lower the frequency of pulse signals generated from the pulse generator 210. The microcomputer 230 receives the gate signal generated by the counter 220 and compares the gate signal with a preset reference signal memorized in the internal memory (not shown). The microcomputer 230 obtains a compensation value for the EMF, preferably by compensation tables or a compensation formula stored in the internal memory and further outputs the obtained compensation value to the horizontal processor 240. The horizontal processor 240 brings about stabilized pictures displayed on a screen by compensating for the deflection of electron beam in a cathode ray tube.

Figure 3:
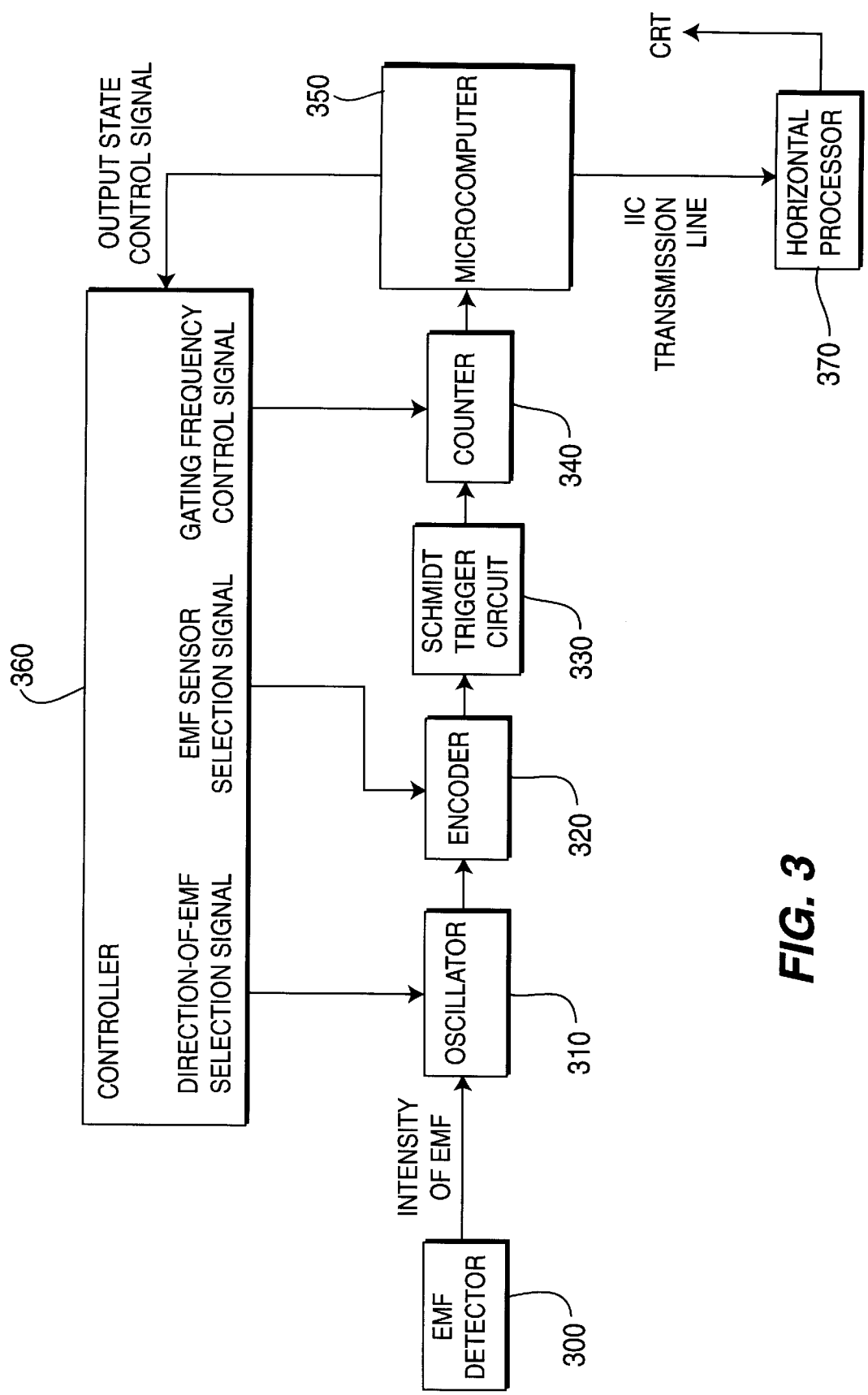
FIG. 3 is a block diagram illustrating the construction of another embodiment of an automatic magnetic field compensator in accordance with the principles of the present invention.

Regarding FIG. 3, an EMF detector 300, which comprises the EMF sensors, detects the EMF in response to EMF output control signals. The EMF sensors detect forward and reverse components of the EMF. An oscillator 310 oscillates at a predetermined frequency according to the intensity of the EMF input from the EMF detector 300 in response to direction-of-EMF selection signals for selecting one of the forward and reverse components of the EMF and outputs the oscillation signals. An encoder 320 selectively outputs the oscillation signals input from the oscillator 310 in response to EMF sensor selection signals from the EMF detector 300 thereby effectively selecting one of the EMF sensors in the EMF detector 300. A Schmidt trigger circuit 330 transforms the oscillation signals from encoder 320 into square-wave signals with a predetermined frequency. A counter 340 counts the square-wave signals from Schmidt trigger circuit 320 at predetermined times in response to gating frequency control signals to generate a gate signal. Counter 340 serves to lower the frequency of the square-wave signals from Schmidt trigger circuit 320. A microcomputer 350 receives the gate signal generated by counter 340 and compares the gate signal with a preset reference signal to output a compensation value for EMF via an IIC (Inter-IC) transmission line. The microcomputer 350 further outputs output state control signals for controlling the output state of EMF detector 300. A controller 360 outputs the direction-of-EMF selection signals to oscillator 310 and the EMF sensor selection signals to encoder 320 in response to the output state control signals from the microcomputer 350. The controller 360 further outputs the gating frequency control signals to the counter 340 in response to the output state control signals from the microcomputer 350. A horizontal processor 370, connected to the microcomputer 350 via the IIC transmission line, compensates for the deflection of an electron beam emanating from an electron gun in a CRT in response to the compensation value generated by the microcomputer 350.

In an automatic magnetic field compensator as described above, the microcomputer 350 outputs the output state control signals to the controller 360. In response to the output state control signals, the controller 360 outputs the direction-of-EMF selection signals to the oscillator 310, the EMF sensor selection signals to the encoder 320 and the gating frequency control signals to the counter 340. The EMF sensor selection signals serve to determine one of a plurality of the EMF sensors in the EMF detector 300. The direction-of-EMF selection signals serve to determine in which direction of the forward and reverse ones an electric current should flow in the EMF sensor so as to detect the EMF. The gating frequency control signals serve to determine the number of counting times for generating the gate signal. Then, the Schmidt trigger circuit 330 receives the oscillation signals according to the intensity of the EMF detected by the EMF sensor, which is selected by the oscillator 310 and the encoder 320, and outputs the corresponding square-wave signals. The counter 340 counts the square-wave signals from the Schmidt trigger circuit 330 at predetermined times in response to the gating frequency control signals to generate a gate signal, which is output to the microcomputer 350. The microcomputer 350 receives the gate signal generated by the counter 340 and compares the gate signal with a preset reference signal to output a compensation value for the deflection of electron beam in a CRT display to the horizontal processor 370 via an IIC transmission line. The stabilized pictures are displayed on the screen of CRT as the EMF is compensated for. The compensation value is are obtained preferably by compensation tables or compensation formula stored in the internal memory.

Figure 4:
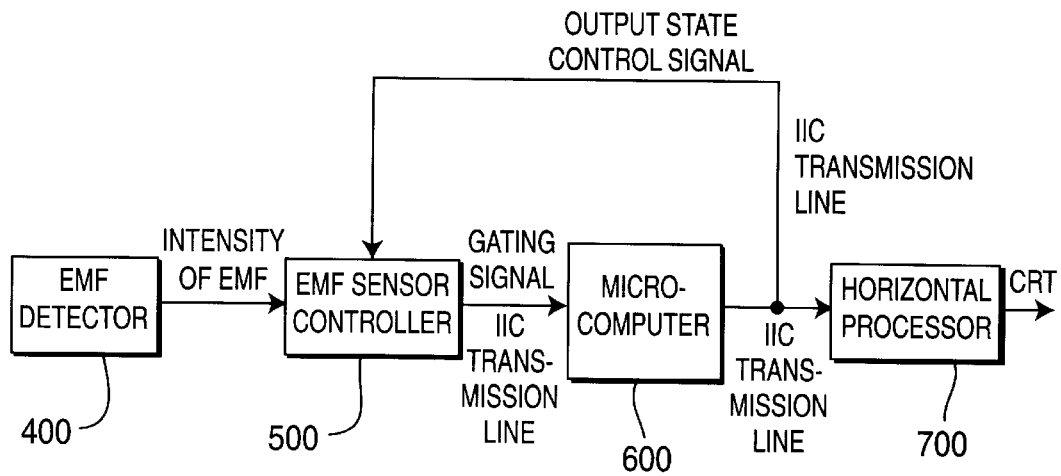
FIG. 4 is a block diagram illustrating the construction of further another embodiment of an automatic magnetic field compensator in accordance with the principles of the present invention.

Regarding FIG. 4, an EMF detector 400, which comprises EMF sensors, detects the EMF in response to EMF output control signals. An EMF sensor controller 500 determines a predetermined EMF sensor in response to EMF sensor selection signals for selecting a predetermined EMF sensor among a plurality of EMF sensors in the EMF detector 400. EMF sensor controller 500 further determines the direction of EMF detected by the predetermined EMF sensor in response to direction-of-EMF selection signals and outputs a gate signal according to the intensity of EMF input from the predetermined EMF sensor. A microcomputer 600, connected to the EMF sensor controller 500 via an IIC transmission line, outputs the EMF sensor selection signals and the direction-of-EMF selection signals to the EMF sensor controller 500 via the IIC transmission line. The microcomputer 600 receives the gate signal input from the EMF sensor controller 500 via the IIC transmission line. The microcomputer 600 compares the gate signal with a preset reference signal stored in the internal memory to output a compensation value for the EMF via an IIC transmission line using compensation tables or compensation formula stored in the internal memory. A horizontal processor 700, connected to the microcomputer 600 via the IIC transmission line, compensates for the deflection of an electron beam emanating from an electron gun in a CRT in response to the compensation value generated by the microcomputer 600.

Figure 5:
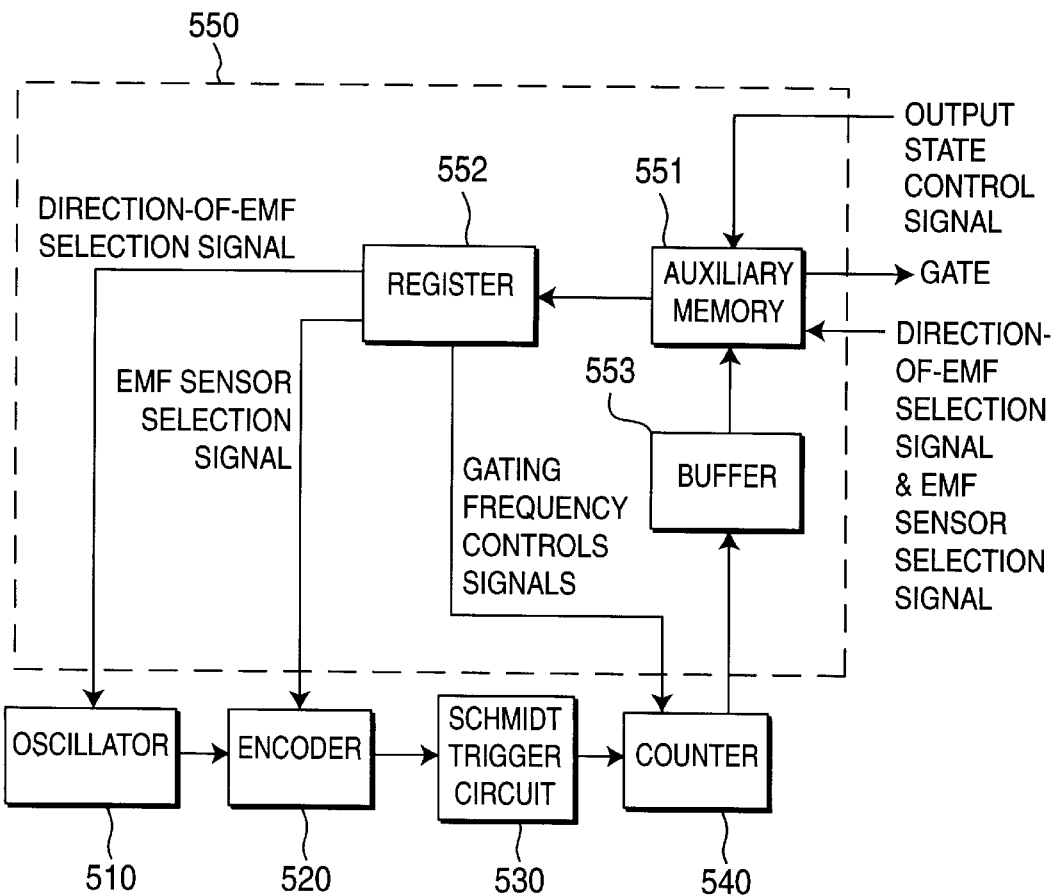
FIG. 5 is a block diagram illustrating the construction of the EMF sensor controller of FIG. 4.

FIG. 5 is a block diagram illustrating the construction of the EMF sensor controller 500 of FIG. 4. The EMF sensor controller 500 comprises an oscillator 510, an encoder 520, a Schmidt trigger circuit 530, a counter 540 and a controller 550. The oscillator 510 outputs oscillation signals according to the intensity of the EMF input from the EMF detector 400 in response to the direction-of-EMF selection signals for selecting one of the forward and reverse components of EMF. The encoder 520 selectively outputs the oscillation signals input from the oscillator 510 in response to the EMF sensor selection signals for selecting one of the EMF sensors in the EMF detector 400. The Schmidt trigger circuit 530 transforms the oscillation signals input from the encoder 520 into the square-wave signals with a predetermined frequency. The counter 540 counts the square-wave signals from the Schmidt trigger circuit 530 at predetermined times in response to gating frequency control signals to generate a gate signal. The controller 550 outputs the direction-of-EMF selection signals to the oscillator 510 and the EMF sensor selection signals to the encoder 520 in response to the output state control signals from the microcomputer 600. Controller 550 further outputs the gating frequency control signals to the counter 540 in response to the output state control signals from the microcomputer 550. The above-described controller 550 comprises an auxiliary memory 551, a register 552 and a buffer 553. The auxiliary memory 551 stores temporarily the EMF sensor selection signals and the direction-of-EMF selection signals, which is input from the microcomputer 600 via an IIC transmission line, and transmits the gate signal from the counter 540 to the microcomputer 600 via the IIC transmission line. The register 552 stores and outputs sequentially the EMF sensor selection signals, the direction-of-EMF selection signals and the gating frequency control signals from the auxiliary memory 551. The buffer 553 stores the gate signal from the counter 540 temporarily in response to the gating frequency control signals from the register 552 and outputs the gate signal to the auxiliary memory 551.

In an automatic magnetic field compensator as described above, the microcomputer 600 is connected to the horizontal processor 700 and the EMF sensor controller 500 via an IIC transmission line. The control signals, which are necessary for transforming the EMF detected by the EMF sensor into the gate signal, are input from the microcomputer 600 to the EMF sensor controller 500 by the IIC transmission line. In the EMF sensor controller 500, the direction-of-EMF selection signals, the EMF sensor selection signals and the gating frequency control signals are stored in the register 552 by the auxiliary memory installed inside the controller 550. The stored direction-of-EMF selection signals are output to the oscillator 510 and the stored EMF sensor selection signals are output to the encoder 520, respectively. The operation of oscillator 510, encoder 520 and Schmidt trigger circuit 520 is not described below in detail since it is the same as that of the corresponding elements in FIG. 3. The counter 540 counts the square-wave signals from the Schmidt trigger circuit 530 in response to the gating frequency control signals from the register 552 to generate a gate signal. The gate signal is transmitted to the microcomputer 600 through the buffer 553 and the auxiliary memory 554 in the controller 550. The operations of microcomputer 600 and horizontal processors 700 are the same as those of the corresponding elements in FIG. 3. The substantial difference between the automatic magnetic compensators of FIG. 3 and FIG. 4 is as follows: simplification of the circuit is realized in FIG. 4 by replacing a few blocks of FIG. 3, which cause the EMF detected by the EMF detector 400 to be transformed into a gate signal and then received into the microcomputer 600, with a single chip of an EMF sensor controller 500. Further, the gate signal is input to the microcomputer 600 via an IIC transmission line by the controller 550 installed inside the EMF sensor controller 500 in FIG. 4, while it is input directly from the counter 340 to the microcomputer 350 in FIG. 3.

As described above, the present invention detects accurately the EMF at the installation site of a display by magnetic sensors and compensates automatically for the deflection of electrom beam by EMF in case that the display with a CRT is moved from one site into another site. As a result, the present invention provides the effects of compensating for picture distortion, screen tilt, image spread, and unstable color convergence and therefore displays stabilized pictures on a screen.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An apparatus for automatically compensating for deflection of an electron beam in a cathode ray tube display due to an effect of earth's magnetic field (EMF), the apparatus comprising:

detection means for detecting the EMF in response to EMF output control signals;

a pulse generator for generating pulse signals with a predetermined frequency, the predetermined frequency corresponding to the EMF detected by the detection means;

a counter for counting the pulse signals generated by said pulse generator at predetermined times to generate a gate signal;

control means for receiving the gate signal generated by the counter and comparing the gate signal with a reference signal to generate a compensation value for the EMF, the control means further generating output state control signals for controlling an output state of the detection means; and process means for compensating for deflection of the electron beam in the cathode ray tube by the EMF in response to the compensation value generated by the control means.

2. An apparatus according to claim 1, wherein the detection means comprises a plurality of magnetic sensors for respectively sensing each directional component of the EMF, each directional component of the EMF detected by the associated magnetic sensor being sequentially input to the pulse generator in response to the output state control signals from the control means.

3. An apparatus for automatically compensating for deflection of an electron beam in a cathode ray tube display by the earth's magnetic field (EMF), the apparatus comprising:

an EMF detector comprising a plurality of EMF sensors for detecting at least one of a plurality of directional components of the EMF where the cathode ray tube display is located and outputting forward or reverse components of the detected directional components:

an oscillator for outputting oscillation signals according to an intensity of the forward or reverse EMF output by the EMF detector, in response to direction-of-EMF selection signals;

an encoder for selecting one of the EMF sensors in the EMF detector, in response to EMF sensor selection signals, by selectively outputting the oscillation signals input from said oscillator;

a Schmidt trigger circuit for transforming the oscillation signals from the encoder into square-wave signals with a predetermined frequency;

a counter for counting the square-wave signals from the Schmidt trigger circuit at predetermined times in response to gating frequency control signals to generate a gate signal;

a microcomputer for receiving the gate signal generated by the counter and comparing the gate signal with a preset reference signal to output a compensation value for the EMF via an IIC transmission line, the microcomputer further outputting output state control signals for controlling an output state of the EMF detector;

a controller outputting respectively the direction-of-EMF selection signals to the oscillator and the EMF sensor selection signals to the encoder and the gating frequency control signals to the counter in response to the output state control signals from said microcomputer; and a horizontal processor, connected to said microcomputer via the IIC transmission line, for compensating for the deflection of the electron beam in the cathode ray tube display by the EMF in response to the compensation value output by said microcomputer.

4. An apparatus for automatically compensating for deflection of an electron beam in a cathode ray tube display by the earth's magnetic field (EMF), the apparatus comprising:

an EMF detector having a plurality of EMF sensors which detect each directional component of the EMF where the cathode ray tube display is located;

an EMF sensor controller for selecting a predetermined one of said plurality of EMF sensors in response to an EMF sensor selection signal, determining a direction of the EMF detected by the selected EMF sensor in response to a direction-of-EMF selection signal and outputting a gate signal according to an intensity of the EMF input from the selected EMF sensor;

a microcomputer, connected to the EMF sensor controller via an IIC transmission line, for outputting the EMF sensor selection signal and the direction-of-EMF selection signal to the EMF sensor controller via the IIC transmission line, the microcomputer further receiving the gate signal from the EMF sensor controller via the IIC transmission line and comparing the gate signal with a preset reference signal to output a compensation value for the EMF via the IIC transmission line; and a horizontal processor, connected to the microcomputer via the IIC transmission line, for compensating for the deflection of electron beam in the cathode ray tube display by the EMF in response to the compensation value output by the microcomputer.

5. An apparatus according to claim 4, said EMF sensor controller comprising:

an oscillator for outputting oscillation signals according to the intensity of EMF input from the EMF detector in response to the direction-of-EMF selection signal;

an encoder for selectively outputting the oscillation signals from the oscillator in response to the EMF sensor selection signal;

a Schmidt trigger circuit for transforming the oscillation signals input from the encoder into square-wave with a predetermined frequency;

a counter for counting the square-wave signals from Schmidt trigger circuit at predetermined times in response to a gating frequency control signal to generate the gate signal; and a controller for outputting respectively the direction-of-EMF selection signal to the oscillator, the EMF sensor selection signal to the encoder and the gating frequency control signal to the counter, in response to output state control signals from said microcomputer.

6. An apparatus according to claim 5, said controller comprising:

an auxiliary memory for storing the gating frequency control signal and for temporarily storing the EMF sensor selection signal and the direction-of-EMF selection signal, said EMF sensor selection signal and said direction-of-EMF selection signal being output from the microcomputer via the IIC transmission line, and for transmitting the gate signal from the counter to the microcomputer via the IIC transmission line;

a register for storing and outputting sequentially the EMF sensor selection signal, the direction-of-EMF selection signal and the gating frequency control signal from the auxiliary memory; and a buffer for temporarily storing the gate signal output from the counter and outputting the gate signal to the auxiliary memory.

* * * * *